(12) United States Patent
Corrigan et al.

(10) Patent No.: US 6,313,752 B1
(45) Date of Patent: Nov. 6, 2001

(54) SYSTEM FOR DISPLAYING DYNAMIC ON-LINE OPERATING CONDITIONS OF AN INTERCONNECTED POWER TRANSMISSION NETWORK

(76) Inventors: Steven P. Corrigan, 14100 N. 46th Ave., B-101, Tampa, FL (US) 33613; John R. Linders, 3601 Somerville Dr., Sarasota, FL (US) 34232-4449

( * ) Notice: Subject to any disclaimer, the term of this patent is extended or adjusted under 35 U.S.C. 154(b) by 0 days.

(21) Appl. No.: 09/083,071

(22) Filed: May 21, 1998

(51) Int. Cl.$^7$ ................................................ G08B 21/00
(52) U.S. Cl. ..................... 340/657; 340/658; 340/660; 340/691.6; 340/870.16; 340/870.25; 340/988; 324/76.13; 700/286; 700/291; 702/59
(58) Field of Search ........................... 340/657, 658, 340/660, 661, 659, 662, 664, 679, 681, 650, 635, 691.6, 691.2, 870.16, 870.25, 988; 324/76.11, 76.12, 76.13, 126, 512; 700/291, 286; 702/58, 59, 61, 62

(56) References Cited

U.S. PATENT DOCUMENTS

| | | | |
|---|---|---|---|
| 5,181,026 | * | 1/1993 | Granville .................... 340/870.28 |
| 5,216,621 | * | 6/1993 | Dickens ............................ 702/58 |
| 5,341,088 | * | 8/1994 | Davis ............................. 324/106 |
| 5,434,509 | * | 7/1995 | Blades ............................ 324/536 |
| 5,506,789 | * | 4/1996 | Russell et al. ..................... 702/58 |
| 5,565,783 | * | 10/1996 | Lau et al. ........................ 324/522 |
| 5,717,388 | * | 2/1998 | Janoska et al. ................ 340/870.16 |
| 5,790,285 | * | 8/1998 | Mock ............................. 359/110 |
| 5,808,902 | * | 9/1998 | Levert et al. ..................... 700/293 |
| 5,890,097 | * | 3/1999 | Cox .............................. 702/67 |
| 5,963,457 | * | 10/1999 | Kanoi et al. ..................... 700/291 |

* cited by examiner

Primary Examiner—Benjamin C. Lee
(74) Attorney, Agent, or Firm—Arthur W. Fisher, III (57) ABSTRACT

A system for displaying dynamic on-line operating conditions of an interconnected power transmission network including components to monitor the interconnected power transmission network by measuring and correlating voltage magnitude and phase existing at selected station busses of the interconnected power transmission network and to display isovoltage and isophase contour lines on a map representative of the interconnected power transmission network geographic area thereby showing existing operating conditions of the interconnected power transmission network wherein the location and nature of any disturbances occurring on the interconnected power transmission network is indicated on the map by a change in the positions of the isovoltage and isophase contour lines relative to the normal network operating isovoltage and isophase contour lines such that upon detection of an abnormal operating condition a system operator may initiate action within the interconnected power transmission network to correct for the specific system disturbance or abnormality.

34 Claims, 11 Drawing Sheets

SYSTEM FOR DISPLAYING DYNAMIC ON-LINE OPERATING CONDITIONS OF AN INTERCONNECTED POWER TRANSMISSION NETWORK

BACKGROUND OF THE INVENTION

1. Field of the Invention

The present invention generally relates to interconnected power transmission networks and more particularly to a system for displaying the dynamic on-line operating conditions of an interconnected power transmission network.

2. Description of the Prior Art

An electric power network is comprised of three systems: generation, transmission and distribution. In order to deliver electric power across vast distances, the voltage developed by a generation system must be "stepped up" by transformers to a very high voltage for transport to customers. This high voltage is then delivered to a customer's area on a transmission system. Once in the customer's area, the high voltage is "stepped down" by transformers to a lower voltage level then delivered to local customers through a distribution system. Generated voltage is stepped up to very high levels to prevent the loss of power during transmission.

In order to maintain the high voltage level during transmission, maintenance areas or "busses" are installed along the transmission system, where the voltage entering a buss is the same magnitude as the voltage leaving the buss. A "substation" is not only a maintenance area, but is also used to step down the transmission voltage for distribution to customers.

In the operation of an electric power network, and especially in an interconnected power transmission network extending over a large geographic area, system operators, the personnel who control these systems are occasionally confronted with disturbances or abnormal conditions which defy analysis in the time available to avoid a major brown out, or complete power outage over an extended portion of the network. This is due to the fact that the amount of detailed information available to the system operator is beyond one's ability to comprehend when a serious emergency occurs. As a result, massive system outages can occur beyond those caused by the initial failure.

Individual power systems are interconnected with neighboring power systems for improved security and economic reasons. The security benefits arise from the fact that interconnected companies have many more generators on the line than a single company, and the greater dispersion of generation will improve the likelihood that a severe contingency generally will not lead to as critical a condition as would occur for the individual companies. The economic value of interconnections is found in the economy of scale that pervades most all utility operating costs.

To secure these interconnection benefits, each utility should operate according to a combined or coordinated system plan for joint and cooperative operation. This requires each company's operating center to process more information on a continuing basis than as an independently operated utility. Thus, the burden on a system operator is increased as more data becomes available when an emergency does develop. Alternately, if individual system operators are not privy to adjacent system operating data, a calamity can overtake the combined systems before a problem is fully recognized by any one of the operators.

These effects result in a measure of insecurity, offsetting some of the advantage noted above for joint or interconnected operation. There is an undefined limit to the size of an interconnected system based not on conventional network loading and voltage constraints, but on this limitation of processing massive amounts of operating data in a timely manner. The occasional security failure of the western power "doughnut" is possibly due to this fact.

The information which a system operator has to work with consists of the magnitude of quantities such as amperage from key locations throughout the system. These values are telemetered to the system operator over reliable communication circuits where they are displayed by standard large faced numerical meters, or video monitor. Some of the meters may be located at the system operator's desk and some on the mimic board (a diagram replicating the lines, transformers and other components of the system) at the same location as the source of the derived signal in the power network. The mimic board will also have other information displayed by different colored lights, also located comparable to the source of the information in the network. The color of these lights have various meanings regarding the condition of various components in the network, such as temperature of transformers, position (open or closed) of circuit breakers, disconnect switches and the like. Equipment which is out of service for maintenance or construction reasons also will be indicated on the mimic board.

The system operator also has telephone communications with key field operating personnel and uses information obtained from the operating personnel to augment telemetered information for manually keeping the system in an adequate security position, and keeping his mimic board up to date on the status of equipment outages and any other equipment that does not have telemetry facilities in service. While each company's system operator has the condition of all interconnection tie lines to neighboring utilities available to him, an operator generally will not have full details of the internal conditions of neighboring utilities available, except by telephone communications. In the panic of a power system disturbance, it may be an considered an abnormal demand upon a system operator to drop what the operator is doing in order to phone neighboring utilities to keep them informed.

It is generally not feasible to reduce a system operator's work load by using more operating personnel because of the network inter-relations, which require that each operator comprehend the entire system to carry out assigned responsibilities. It is therefore evident that an entirely new method of presenting system conditions is needed if the utilities, in their continued growth, are to provide the quality of service required by consumers.

U.S. Pat. No. 5,594,659 discloses a method for performing a voltage stability security assessment for a region of an electric power transmission system having a plurality of buses and a plurality of sources of reactive reserves coupled thereto. The plurality of buses are grouped into a plurality of voltage control areas such that each of the buses within each voltage control area has a substantially similar reactive margin and voltage at the minimum of the corresponding reactive power versus voltage relationship. A corresponding reactive reserve basin is determined for each of at least one of the voltage control areas. Comprising at least one of the sources of reactive reserves selected in dependence upon a measure of the reactive reserves depleted at a predetermined operating point of the electric power transmission system. A single contingency analysis is performed by computing a corresponding quantity for each reactive reserve basin in response to each of a plurality of single contingencies, representative of a reduction in the reactive reserves within the reactive reserve basin. A multiple contingency analysis is performed for each reactive reserve basin using the single contingencies whose corresponding quantity exceeds a predetermined threshold.

U.S. Pat. No. 5,566,085 shows a transient or voltage stability transfer limit calculated for a power network having at least two independent generators supplying a common load through separate transmission lines, steady state values for variable characteristic electrical parameters of variable elements of the network are determined based on particular values for power transferred by the transmission lines. Static values for passive characteristic electrical parameters of passive conductive elements of the network are determined. A contingency resulting in a sudden change of at least one of the variable electrical parameters and the passive electrical parameters is selected. A post contingency steady state value for a voltage at one of the buses is calculated. A voltage over time during a transition period at the bus is calculated, the transition period extending in time from a start of the contingency through a discontinuity during which the voltage is abnormally altered and recovery during which the voltage will tend toward a steady state terminal value. Using two energy values from two power values, a transfer limit estimate for the transmission line is obtained as being an asymptote of the energy values, the energy values being an inverse function of the stability limit less the power value.

U.S. Pat. No. 5,539,651 teaches a system and method for determining the effects of linear and nonlinear loads on electrical power systems. The invention utilizes stored load characteristic data in terms of current spectra at predefined voltage values and network impedances to determine the voltage drop between an electrical substation bus and an electrical load bus. The actual load voltage is determined by an iteration technique which takes the difference between a collected substation voltage and the voltage drop and compares the result Of the difference to an estimated load voltage. For each iteration the estimated load voltage is re-estimated until the difference result equals the estimated voltage, thereby determining the actual load voltage. Knowing the actual load voltage, permits determination of actual current and power values which are compared to collected substation current and power values. If the values are equal, the effects of the harmonics are known. If the values are not equal, load composition data is adjusted and the system repeats the above until the values are equal.

U.S. Pat. Nos. 5,506,789 and 5,512,832 relates to a method and apparatus are provided for detecting an arcing fault on a power line carrying a load current. The apparatus monitors, compiles and analyzes sample parameters taken from successive cycles of the power line load signal indicative of power flow and possible fault events on the line, such as voltage or load current. The analyzed sample parameter is then used to determine a normal parameter corresponding to a normal load pattern for the line.

The normal load parameter is extracted from the compiled sample parameter data, and the resulting difference signal waveform has a magnitude value which changes in amplitude corresponding to the load-extracted data which is used to determine whether a fault exists on the power line.

U.S. Pat. No. 5,479,358 shows a energy supply system including an energy demand plan for predicting an energy demand on the basis of past cases of energy supply and for formulating an energy demand plan with respect to time. The variation of the future energy demand is predicted and energy which accommodates the determined variation can be prepared.

U.S. Pat. No. 5,406,495 teaches a monitoring and control system to invention provide a distributed intelligence, data acquisition and control system which collects and analyzes large amounts of data representing power usage from a power distribution substation. Using a Discrete Fourier Transform, the system provides accurate tracking of the primary frequency of the voltage and current waveforms in the power equipment, and determines the relative phase between the voltage and current waveforms. The system provides real time monitoring of power usage and real time control of various functions in the substation.

U.S. Pat. No. 5,237,511 discloses a improved distribution automation remote terminal unit which directly connects to a distribution feeder. The distribution automation remote terminal unit is directly connected to voltage and current sensors on the feeder to sense the presence of signals on the distribution feeder. The remote terminal unit includes the first transformer interconnected to the potential sensors to produce a potential signal of reduced peak-to-peak voltage corresponding in phase to the AC potential waveform on the distribution feeder. A second transformer is directly coupled to the current sensor for producing a current signal of reduced peak-to-peak voltage corresponding in phase to only the AC current waveform on the distribution feeder. The reduced peak-to-peak voltage signals are delivered into a multiplexer and are sampled a predetermined number of times. The sampled analog voltage is then digitized by a digital to analog converter and delivered into a digital signal processor. Waveform parameters are determined. A microcontroller then accesses the waveform parameters to determine information such as the operation of upstream and downstream devices on the distribution feeder. This information is selectively transmitted to a remote master station over a communications link.

U.S. Pat. No. 233,538 shows a circuit monitoring system for a distributed power network employs waveform capturing techniques for efficient and highly accurate monitoring, including a plurality of circuit monitors and a control station, which is coupled to each of the circuit monitors via a multi-drop communications link. Each of the circuit monitors is disposed adjacent an associated one of the branches in the network for sensing power parameters in the branches and for generating and transmitting data representing the power parameters to the control station. The control station is used for generating monitoring commands to each of the circuit monitors to provide the system with full system control and evaluation capability. The system is capable of simultaneously sensing the waveform at each branch and sampling the waveforms for a predetermined number of sample points over a integral number of cycles so as to provide an efficient yet accurate implementation.

U.S. Pat. No. 4,589,075 relates to a load management system for a power network which both addresses remote load controllers and acquires load data through a retransmission network. A central controller processes power load a data and generates digital messages which address loads and command the selective connection and disconnection Of loads. The central controller transmits the generated digital messages via radio frequency transmissions. Programmable retransmission stations receive, decode and directionally retransmit the digital messages. Addressable remote load controllers receive and decode transmitted digital messages and operate to connect and disconnect loads in response to command messages received by the addressed load controllers. Addressable data acquisition units sense loads at points in the power network and operate to generate digital load data messages. Retransmission stations receive load data messages from the addressable data acquisition units and retransmit load data messages through the retransmission network to the central controller. Yet other digital messages are translated into paging signals and disseminated to remote paging units.

SUMMARY OF THE INVENTION

The disadvantages and shortcomings of the prior art in the operation of large interconnected power transmission networks as exist in the United States are overcome or substantially eliminated by the use of a system and methods for recognizing conditions of an impending power system disturbance by measuring time coincident voltage phasor values throughout the interconnected power transmission network and displaying these values at a central location with a geographic orientation. At each selected station buss, the buss voltage magnitude and phase are digitally computed or derived and time stamped using a common network time base such as is available from the GPS satellite system. This information is transmitted continuously to the system operator at the central location, and may also be stored on site at the selected station busses for future analysis, if this is desired by the utility. At the central location, incoming voltage signals are brought to a common voltage and phase reference while retaining the identity of the corresponding station buss from which each corresponding voltage signal or information was derived. A station buss identity is correlated with the geographic coordinates of the corresponding physical location following which an interpolation of the data on a geographic basis is made to provide geographic points of common electrical values of voltage magnitude and phase. These common valued points are then connected with smooth contour lines (via best fit of a curve), thus providing a comprehensive picture or visual display of voltage and phase conditions of the electrical systems across an entire network of interconnected systems.

This is a dynamic on-line system and these contour lines will change position on a geographic power system map as loads and power generation vary with time. These changes will occur gradually as when more air conditioners are engaged during a hot afternoon and will be recognized by the system operator as the daily variation of a normal system. A power system disturbance or abnormality, however, will result in a rapid variation or change of the contour lines with the shapes and relative dispositions quite different from normal. The extent of these deviations, and the different variations of the isovoltage contours and the isophase contours will indicate the nature and the seriousness of the disturbance or abnormality in the interconnected power transmission network. For example, changes in the voltage magnitude contours, with only a small change in the phase contours, would indicate malfunctioning voltage control somewhere in the system. The extent of this change would indicate where the malfunction is located and the seriousness of the disturbance. Similarly, a change in the phase contours would indicate a loss of generation, load or transmission facilities. Corrective action can then be taken by a system operator to alleviate a possible cascading failure within the interconnected power transmission network and promptly restore the system to a suitable operating condition. Once this method of monitoring electrical system network security is understood and accepted by the industry, the corrective action can be automated.

In accordance with the present invention, the treatment of phasor values at respective transmission busses is in accordance with ANSI/IEEE Standard No. 1344-1995, "Standard for Synchrophasors for Power Systems," approval dated Aug. 1, 1996. Within this embodiment, a user has the option of processing single phase or polyphase voltage data. While the system will perform as described with single phase data, more measurement accuracy and reliability is attained with full three-phase data. By using three phase values, the system positive sequence voltage can be derived and used in place of the above derived single phase values. This adds substantially to the value of this detection system because disturbances or abnormalities on the unmeasured phases in the single phase solution might go undetected, which is not the case when the full three phase information is fully utilized.

The on-line system information provided by this invention not only presents this system data in a much more meaningful manner, but also makes the data available for use as actual input data to theoretical computerized system analysis or "state estimations," and do this more accurately and timely than present computer model methods allow, in this way the invention uses an actual power system as the model to provide for this theoretical analysis of system losses and the optimal configuration of an interconnected power transmission network.

BRIEF DESCRIPTION OF THE DRAWINGS

For a fuller understanding of the nature and object of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
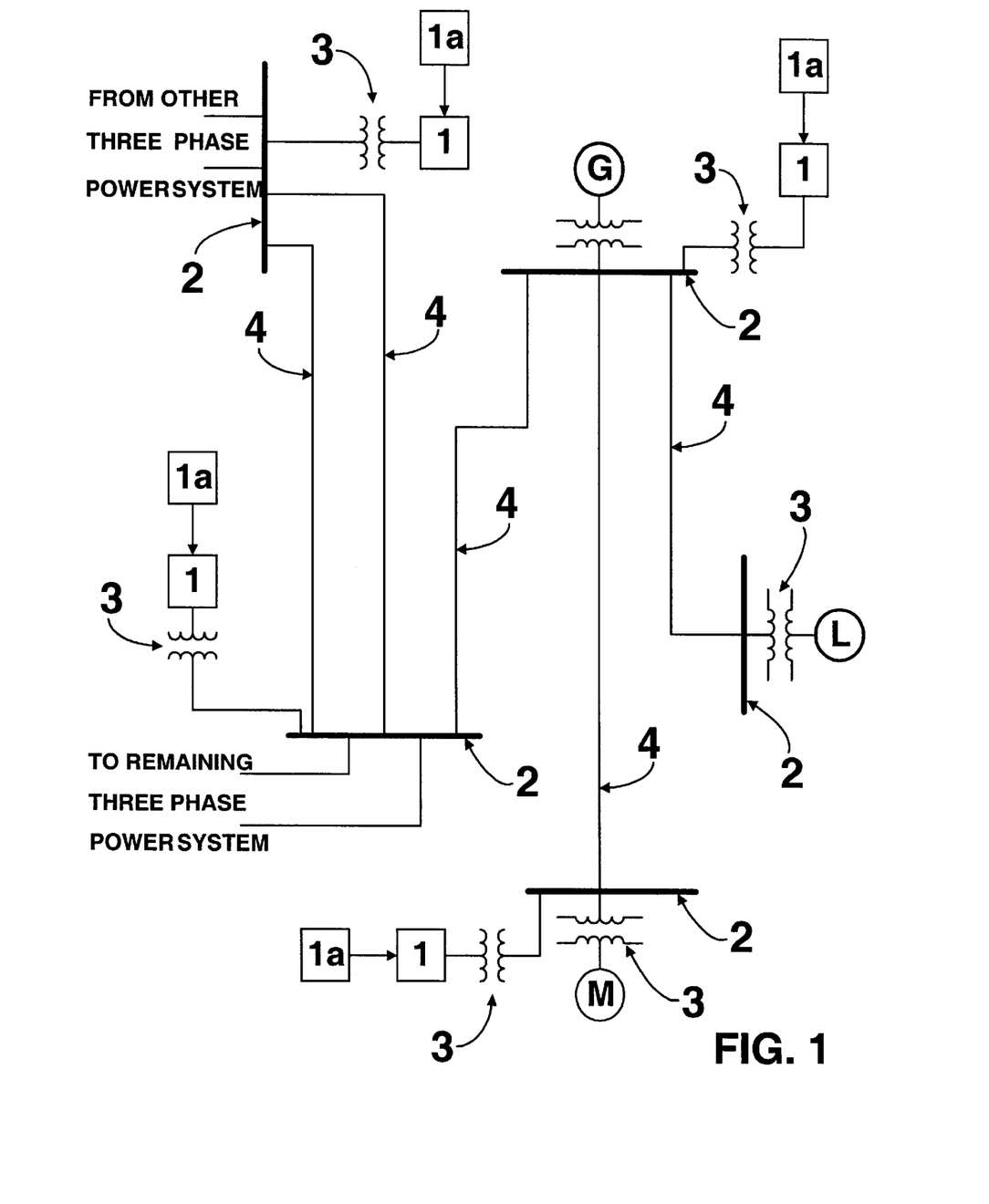
FIG. 1 shows a typical electric power industry representation of a portion of a three-phase power system. Commonly referred to as a one-line diagram, the figure depicts the interconnections and relationships of power company equipment and the location of the present invention on the selected station busses of an electric power system.

FIG. 1 shows a simplified diagram of a portion of an interconnected power transmission system commonly referred to as a one line diagram. A balanced three-phase system is depicted with a single line 4 as a representation of the three phases of the system connected to selected station busses each indicated as 2. Symbols shown on the diagram follow standards set forth in The American National Standards Institute (ANSI) and the Institute of Electrical and Electronics Engineers, as published in IEEE Std 315-1975. These publications have standardized symbols such as a generator G and machinery or other loads L or M. A voltage step-down transformer 3 is typically used by the industry at the station buss 2 to provide voltage at a proper level for distribution to customers. A transmission line analyzer is operatively connected to each selected station buss 2 of the interconnected power transmission system to receive line voltage data or information therefrom reflecting existing operating conditions, to measure or determine a predetermined line operating parameter such as the maximum line voltage, to time stamp the predetermined line operating parameter and to calculate the phasor value of the predetermined line operating parameter for transmission to a central location. Specifically, the transmission line analyzer comprises a microprocessor 1 for analysis of electric power information at each selected station buss 2 and a hyper-accurate time stamp device 1a in accordance with the aforementioned ANS/IEEE Standard No. 1344-1995.

Figure 2:
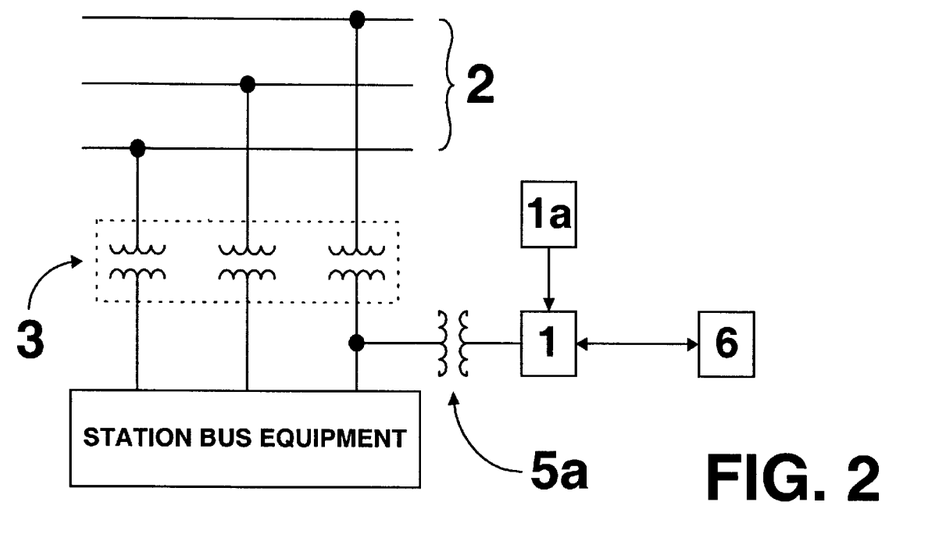
FIG. 2 shows the single-phase transformer connection of the present invention.

FIG. 2 shows single-phase information received from the corresponding selected station buss 2 by the microprocessor 1 through an additional step-down transformer 5a to reduce the power system voltage signal to a magnitude compatible with digital equipment. This represents the initial single-phase selected station buss connection to provide the system information feedback loop of the present invention through a communication means 6 such as a modem to a communication hub 8 at the central location as described more fully hereinafter.

Figure 3:
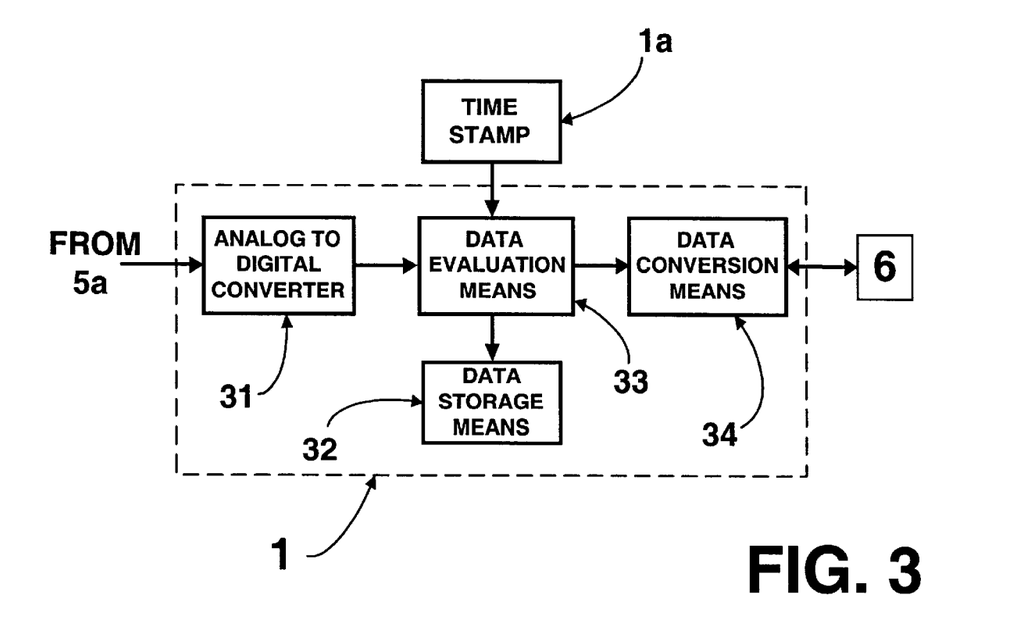
FIG. 3 shows a detailed representation of the flow of single-phase digital information of the present invention.

As shown FIG. 3, the microprocessor 1 comprises an analog to digital converter 31 including means to receive and convert analog line voltage data or information to digital data or information, a line voltage analyzer 33 including means to determine or measure the maximum voltage value received from the corresponding selected station buss 2 through the analog to digital converter 31, to convert the voltage value to the normalized decimal equivalent such as 230,000÷230,000 to a value of 1,000 or 228,750÷230,000= 0.994565, and to time stamp the maximum voltage value with time information from the time stamp device 1a, corresponding to the time of occurrence of the maximum voltage value and a line voltage signal generator 34 including means to calculate the phasor values of the maximum voltage value received from the line voltage analyzer 33 and to generate and transmit voltage phasor data representative of the transmission line voltage of the corresponding station buss 2.

Figure 6:
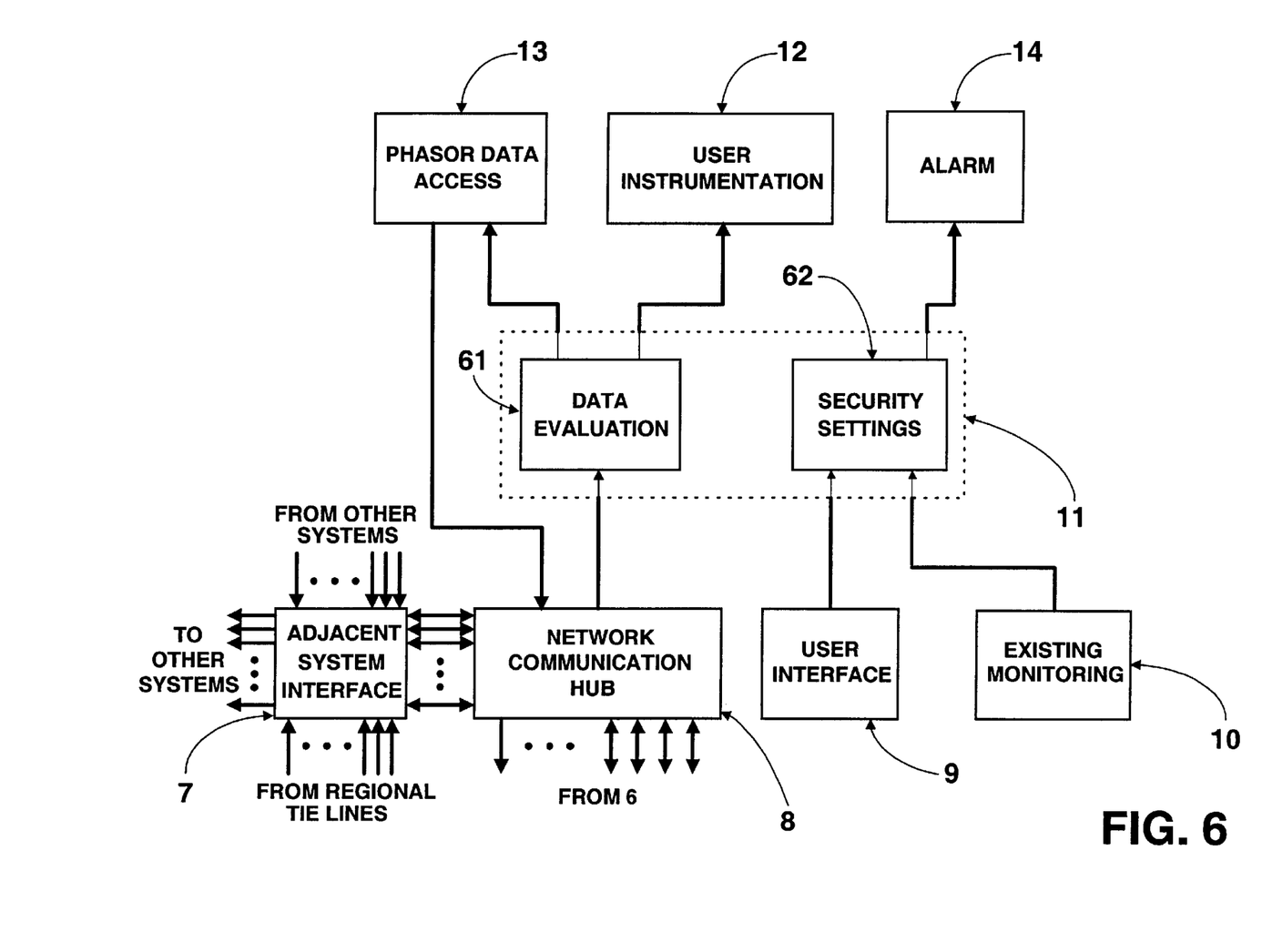
FIG. 6 shows a detailed representation of the flow of digital information in a central processing location received from the present invention.
Figure 7:
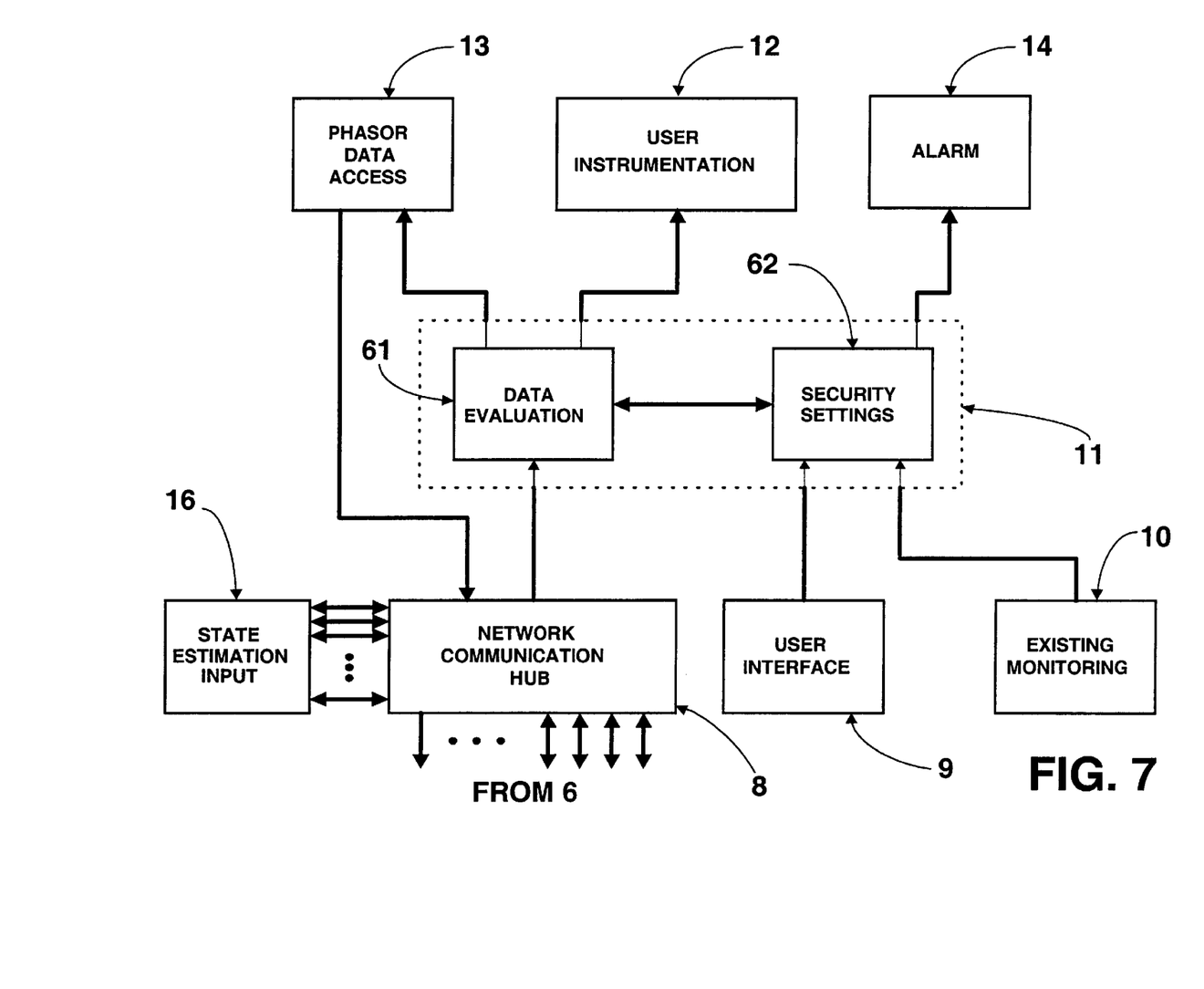
FIG. 7 shows the same presentation as FIG. 6 with incoming system information applied to state estimation.

The time stamp devices 1a throughout the interconnected power transmission network are synchronized and fed time information through a state of the art digital time transmission system or equipment such as that from Global Positioning System (GPS) equipment. These voltage phasor data are continuously transmitted from the selected station busses 2 through the communication equipment 6 as shown in FIG. 2 and FIG. 3 to the communication hub 8 as shown in FIGS. 6 and FIG. 7. The microprocessor 1 may further include a data storage 32 to store selected transmission line signal data or other information for future reference.

Figure 4:
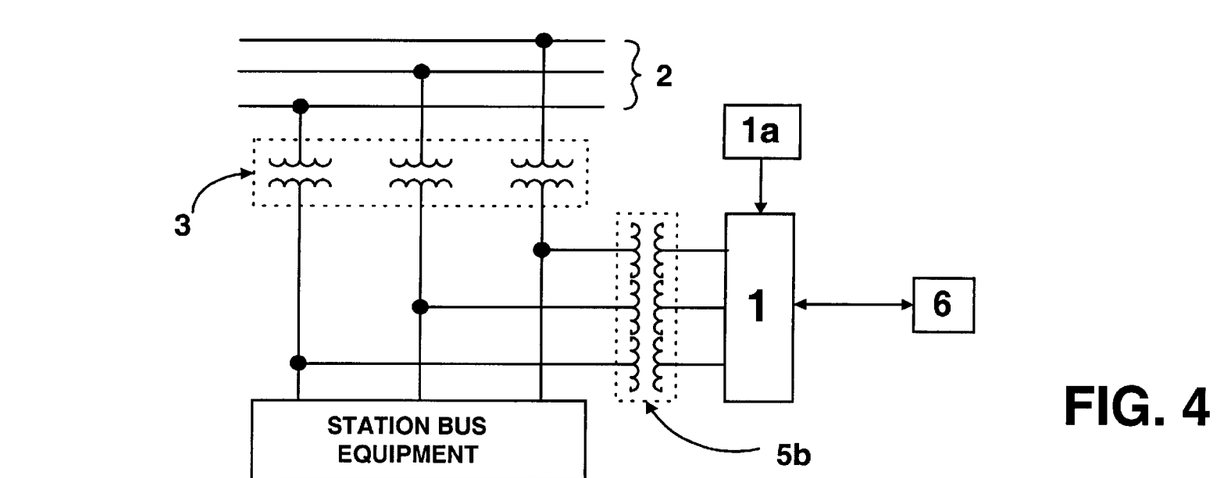
FIG. 4 shows the three-phase transformer connection of the present invention.

FIG. 4 shows three-phase information received from the corresponding selected station buss 2 by the microprocessor 1 through an additional step-down transformer 5b to reduce the power system voltage signal to a magnitude compatible with digital equipment. This represents the initial three-phase selected station buss connection to provide the system information feedback loop of the present invention through a communication means 6 such as a modem to a communication hub 8 at the central location as described more fully hereinafter.

Figure 5:
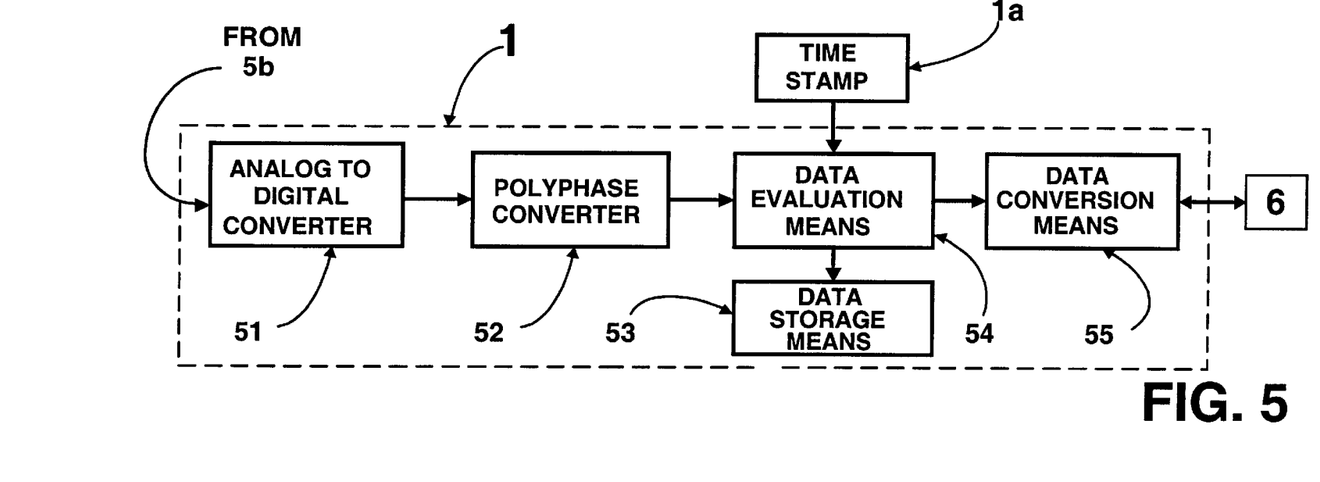
FIG. 5 shows a detailed representation of the flow of three-phase digital information of the present invention.

As shown in FIG. 5, the microprocessor 1 comprises an analog to digital converter 51 including means to receive and convert analog line voltage data or information to digital data or information, a polyphase voltage converter 52 including means to convert the digitized three-phase voltage data or information to a polyphase voltage by means of a standard symmetrical sequence analysis or the like as described more fully herewith, a line voltage analyzer 54 including means to determine or measure the operating maximum voltage value representative of the polyphase voltage received from the corresponding selected station buss 2 through the analog to digital converter 51 and the polyphase voltage converter 52 and to time stamp the maximum voltage value with time information from the time stamp 1a corresponding to the time of occurrence of the maximum voltage value and a line voltage signal generator 55 including means to calculate the phasor values of the time stamped maximum voltage value received from the line voltage analyzer 54 and to generate and transmit voltage phasor data representative of the line voltage. The time stamp devices 1a throughout the interconnected power transmission network are synchronized and fed time information through a state of the art digital time transmission system or equipment such as that from Global Positioning System (GPS) equipment. These voltage phasor data are continuously transmitted from the selected station busses 2 through the communication equipment 6 as shown in FIGS. 4 and FIG. 5 to the communication hub 8 as shown in FIGS. 6 and FIG. 7. The microprocessor 1 may further include a data storage 53 to store selected transmission line information for future reference.

The use of standard symmetrical sequence analysis permits the system to monitor, evaluate and display the operating conditions existing on all three phases at the selected station busses 2. In particular, a further embodiment can also be included when using polyphase voltage. This permits the means for segregating the three phase voltages into the positive, negative, and zero sequence voltage values. These sequence quantities (typically denoted by the subscripts 1, 2, and 0) are developed by solving the following equations:

$$V_1 = V_a + aV_b + a^2V_c,$$

$$V_2 = V_a + a^2V_b + aV_c,$$

$$V_0 = V_a + V^a V_b + V_c,$$

where the notation is standard for sequence values in power engineering in which the operator "a" is a unit operator $e^{2\pi/3}$ which equals 0.866+j0.5, or 1@120°.

In the two latter equations, $V_2$ and $V_0$ are more sensitive than $V_1$ to phase imbalance abnormalities. This is true because these quantities are each zero when a system is perfectly balance, and are not zero when an abnormality involves any significant phase imbalance. However, neither the $V_0$ or $V_2$ is responsive to true three phase power flow, and thus are only supplemental measurements which facilitate the identification of an abnormality, the cause, and its location within the network. The substantial value of these sequence components lies in the logic imbedded in the above noted equations. For example, when a change in $V_2$ is similar to $V_0$, the abnormality involves only one phase. When $V_2$ is significantly greater than $V_0$ the abnormality is a phase to phase condition, and the phase relationship between $V_2$ and $V_0$ identify which phases are involved in the abnormality. Other relationships exist within these equations which are common knowledge to one skilled in the art. Knowing the nature and location of an abnormality is essential to initiating corrective action before there is a full loss of security. There are other equations which could be used for deriving different sets of values to describe active systems, however the described symmetrical component system demonstrated above is preferred as best understood by power technicians.

It will be customary to present only the positive sequence values of magnitude and phase as described above using the geographic contours. The negative and zero sequence values can be presented in the same manner as the positive sequence, as contours of the magnitude and phase on the same map as the positive sequence, or on a separate map to avoid possible confusion of the several quantities. However, it will be usually sufficient to identify the power system location of the negative and zero sequence magnitude values as scalar quantities on digital type meters or computer screen.

Although the system has been described as monitoring, evaluating and displaying voltage magnitude and phase of the transmission line conductors throughout the interconnection power transmission network, other transmission line operating parameters such as harmonic content may be monitored, evaluated and displayed.

FIG. 6 shows the flow of system information or data from the selected station busses 2 through the communications means 6 by a standard polling routine at the network communication hub 8. The network communication hub 8 receives additional on-line operating data or information from other neighboring and other regional systems of strategic importance through a system interface 7. In addition, data from existing utility monitoring devices located throughout the interconnected power transmission network may now be integrated into the present invention through an existing monitoring means 10 such as a standard serial or parallel port access device.

The main output of the network communication hub 8 is a constant flow of on-line system information packets received from the communication means 6 and the system interface 7 to a microprocessor unit 11. System voltage phasor data is evaluated in the microprocessor unit 11 by a data evaluation means 61 which compares existing system conditions with user preset system limits established or set by a security setting means 62. These preset system limits such as voltage magnitude and phase limits from state model estimations are security settings adjusted by power system personnel through an operator interface 9 such as a keyboard for any particular value of concern. When a security setting set in the security setting means 62 is exceeded, a signal is generated by an alarm 14 to immediately alert the system personnel.

The data evaluation means 61 also includes means for the integration of on-line system data for any existing user instrumentation 12 such as analog or digital meters or CRT displays and additionally routes on-line system data to a phasor data access means 13 which may comprises any automated action that responds to preset limits set by system personnel established by the security setting means 62 through the operator interface 9. This automated function completes a feedback loop by utilizing on-line system conditions to initiate automatic system response.

As shown in FIG. 7, this feedback loop also provides on-line data to system personnel for the theoretical assessment of a system response to any varied condition set by the user through a state estimation input means 16 as a function of power system operation. In this way, an electric power system provides or generates an on-line model for system planning and for the evaluation of changes or additions to a system.

Figure 8:
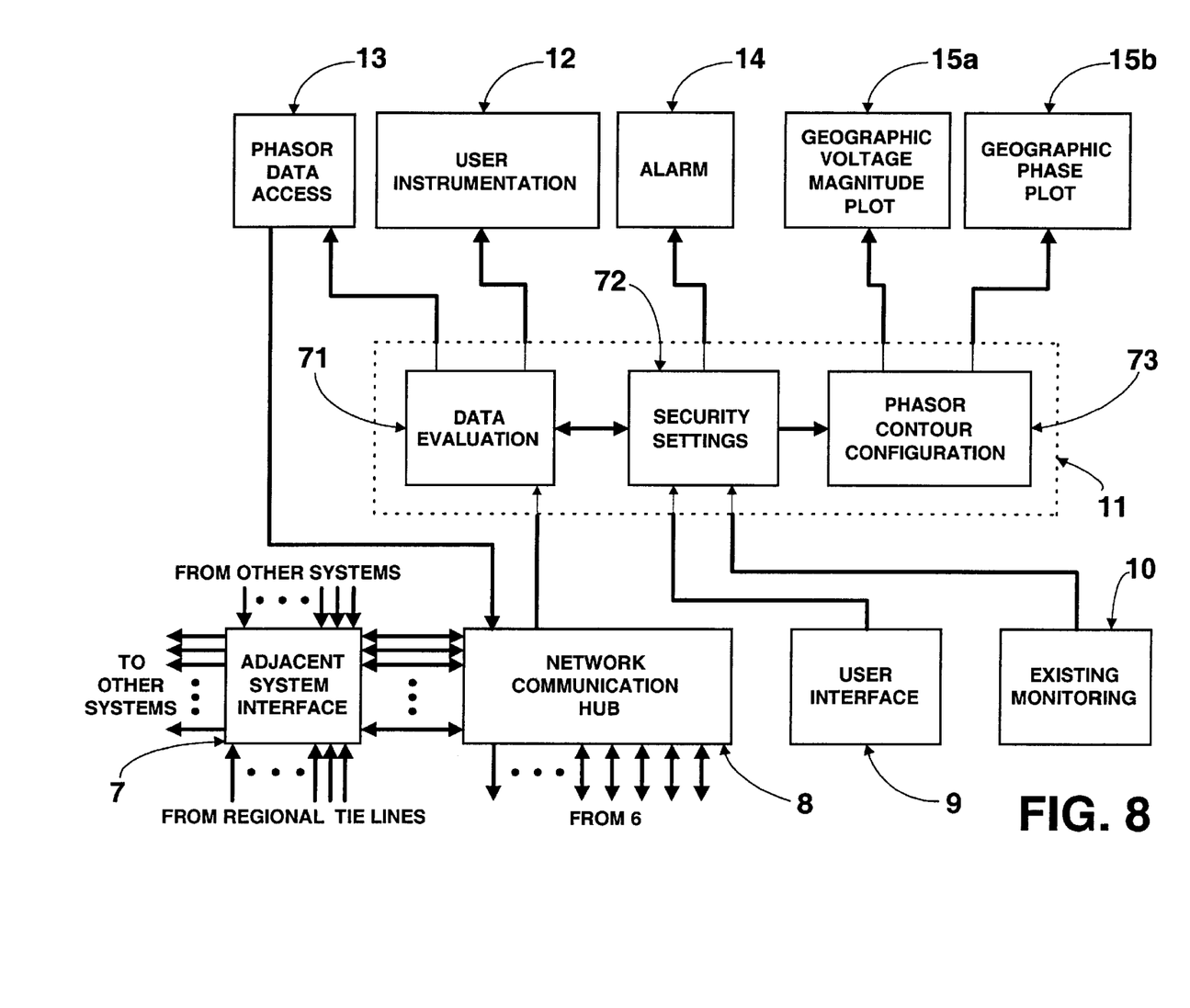
FIG. 8 shows the same flow of digital information displayed in FIG. 6 with the addition of phasor contour mappings.

As shown in FIG. 8, the microprocessor unit 11 further includes a phasor contour configuration means 73 to interpolate incoming voltage phasor values with the corresponding locations on a geographical map. The phasor contour configuration means 73 then applies standard mapping techniques to generate isophase and isovoltage contour lines in relation to the selected station busses 2. The output of phasor contour configuration means 73 is then fed to a geographic voltage magnitude plot video monitor 15a and a geographic phase plot 15b for viewing of on-line operations corresponding to the isophase presentation of FIG. 10 and the isovoltage presentation of FIG. 11. A user defined security setting means 72 for the alarm 14 may now be coordinated with the visual displays of geographic voltage magnitude plot video monitor 15a and a geographic phase plot 15b where any sudden change of the isocontour lines in FIGS. 10 and 11 become a visual alarm as displayed by the sudden change in appearance displayed in FIGS. 12 and 13.

Figure 9:
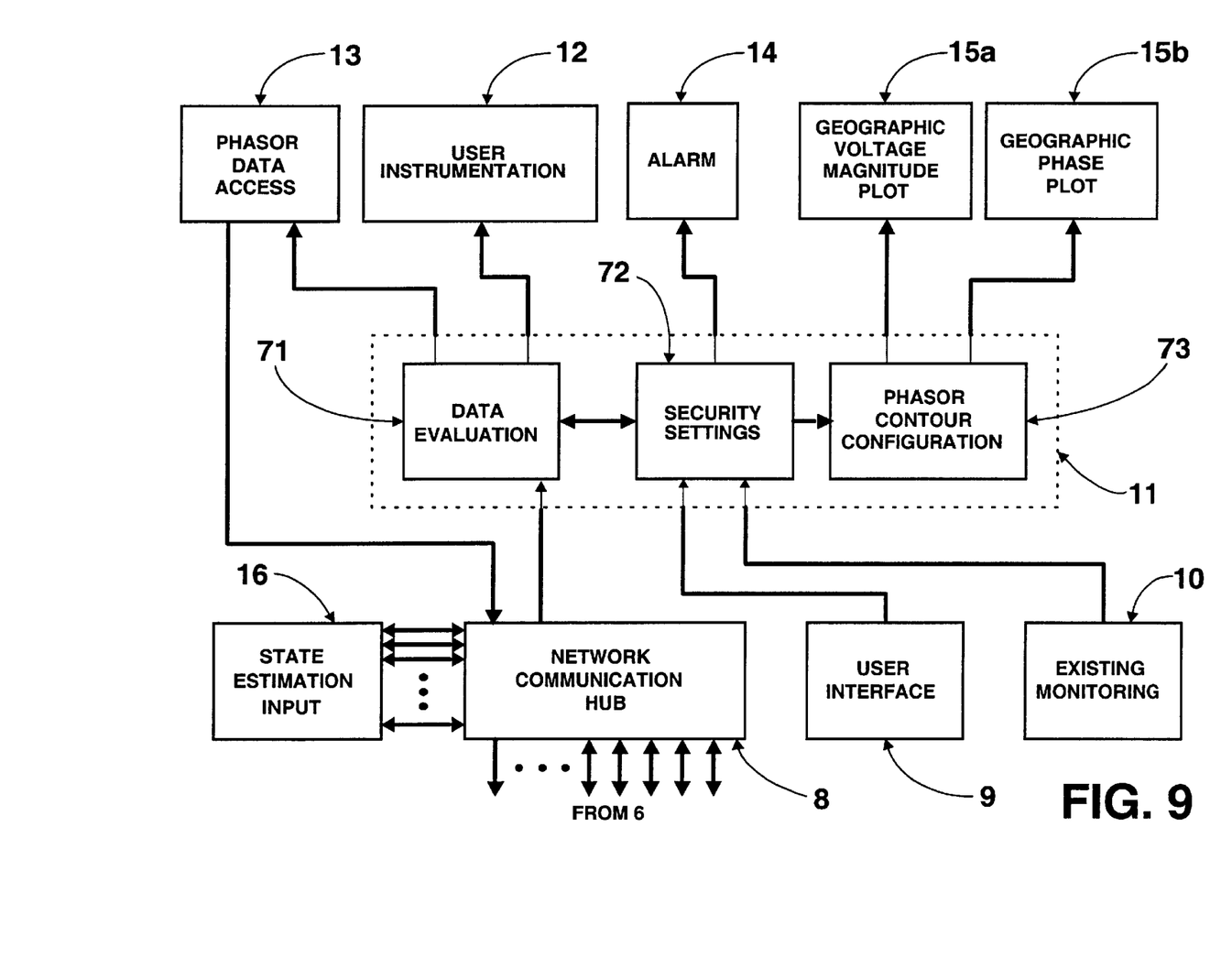
FIG. 9 shows the same presentation as FIG. 8 with incoming system information applied to state estimation.

FIG. 9 is the presentation of FIG. 8 incorporating the three-phase state estimation function that incorporates on-line system information to simulate possible system abnormalities or the effects of new system additions. This function provides for the use of on-line data for theoretical computer simulations of varied system conditions effectively utilizing the system as a self generating model.

Figure 10:
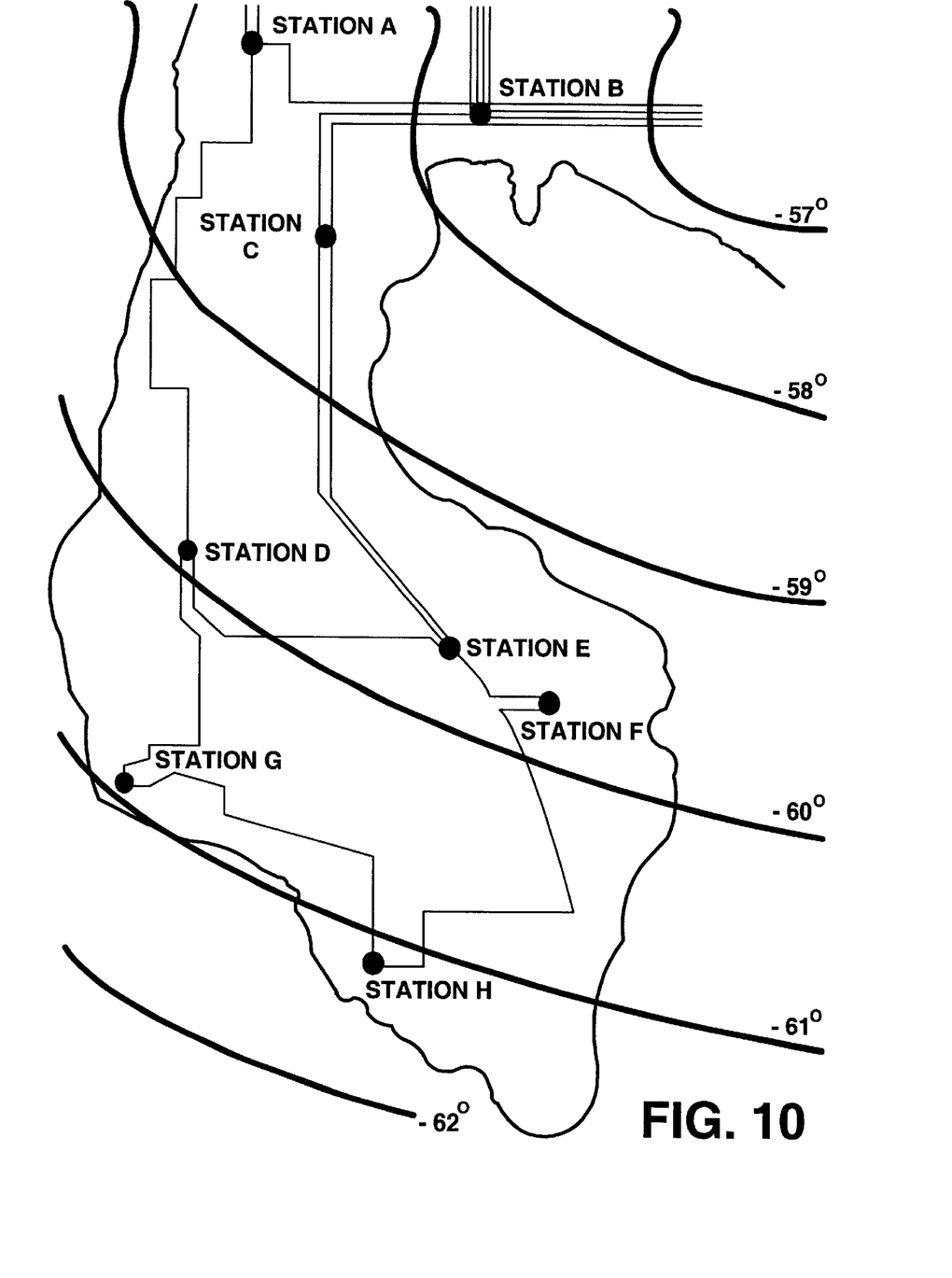
FIG. 10 and FIG. 11 are actual isophase and isovoltage contour mappings created from on-line power system information.
Figure 11:
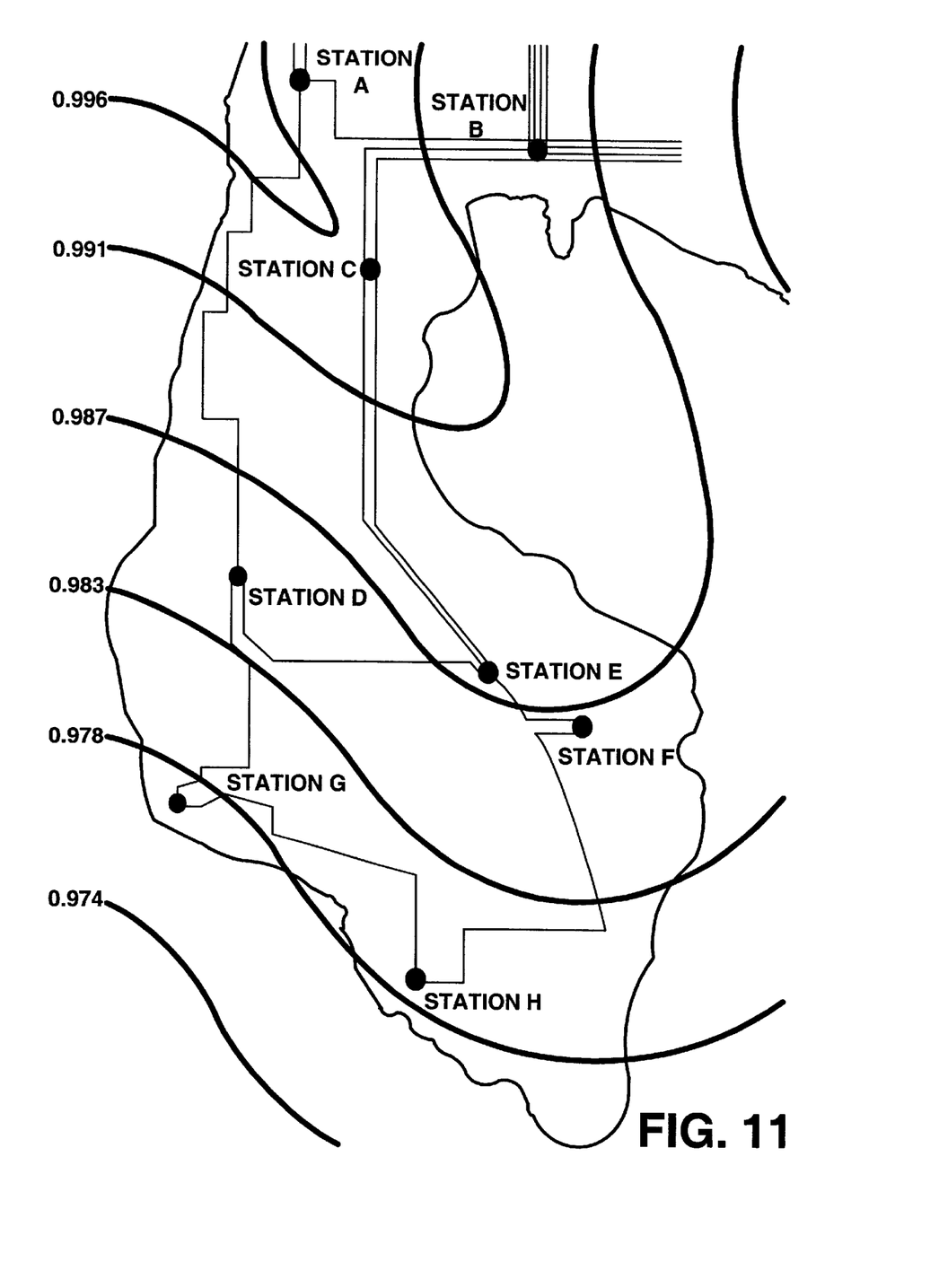

FIGS. 10 and 11 respectively display isophase and isovoltage contour plots of an interconnected power transmission network during normal operation. FIGS. 10 and 11 graphically depict network operating parameters such as the direction and amount of power flow as indicated by the angle and number of isophase lines in FIG. 10. The graphic appearance of normal system or network operation is recognized by system operators. Thus any significant change such as displayed in FIGS. 12 and 13 serves as an alarm or indication of an abnormal system condition such as a transmission line outage or transformer failure.

Figure 12:
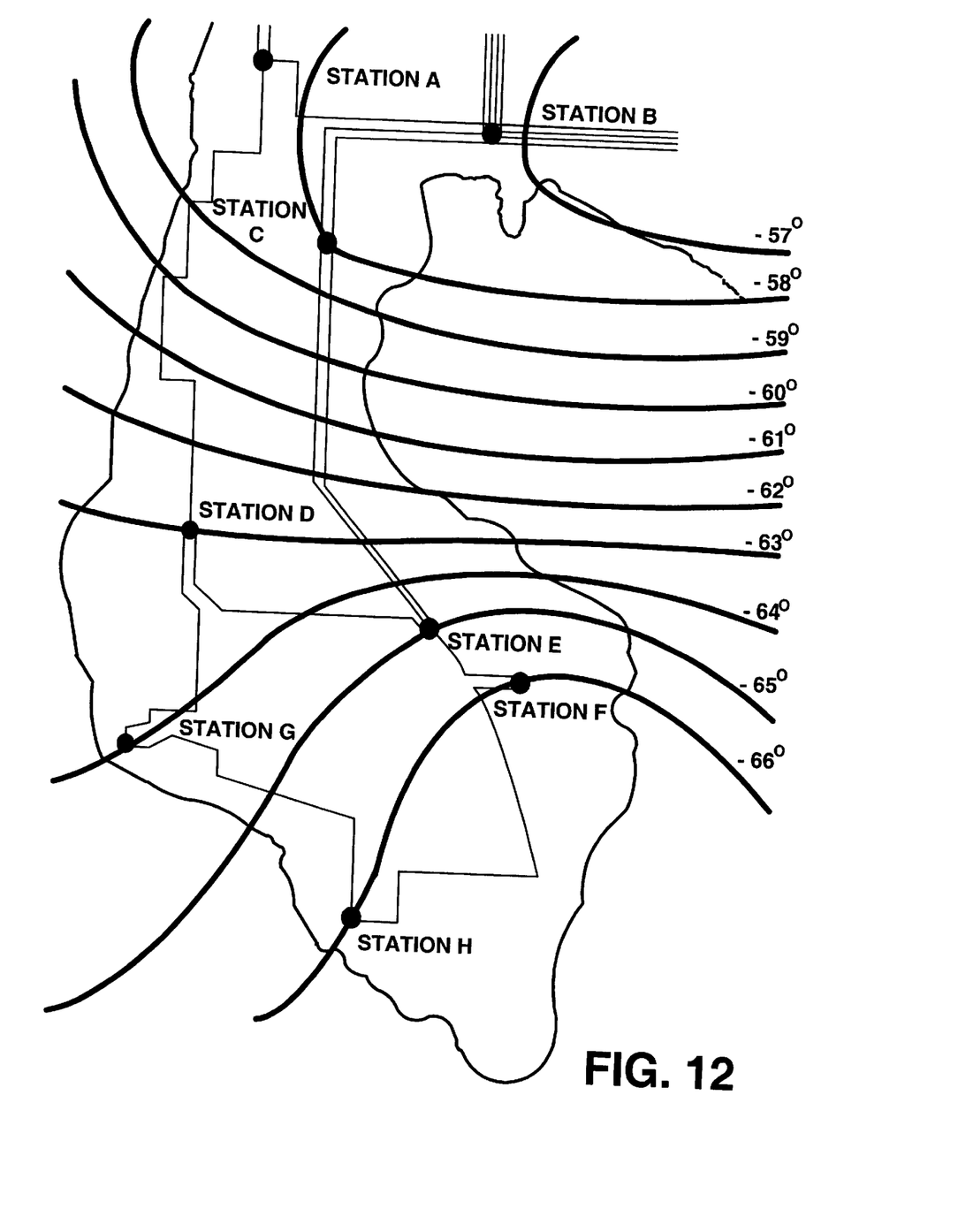
FIG. 12 and FIG. 13 show the phase and voltage contours after a disturbance has occurred in a power system.
Figure 13:
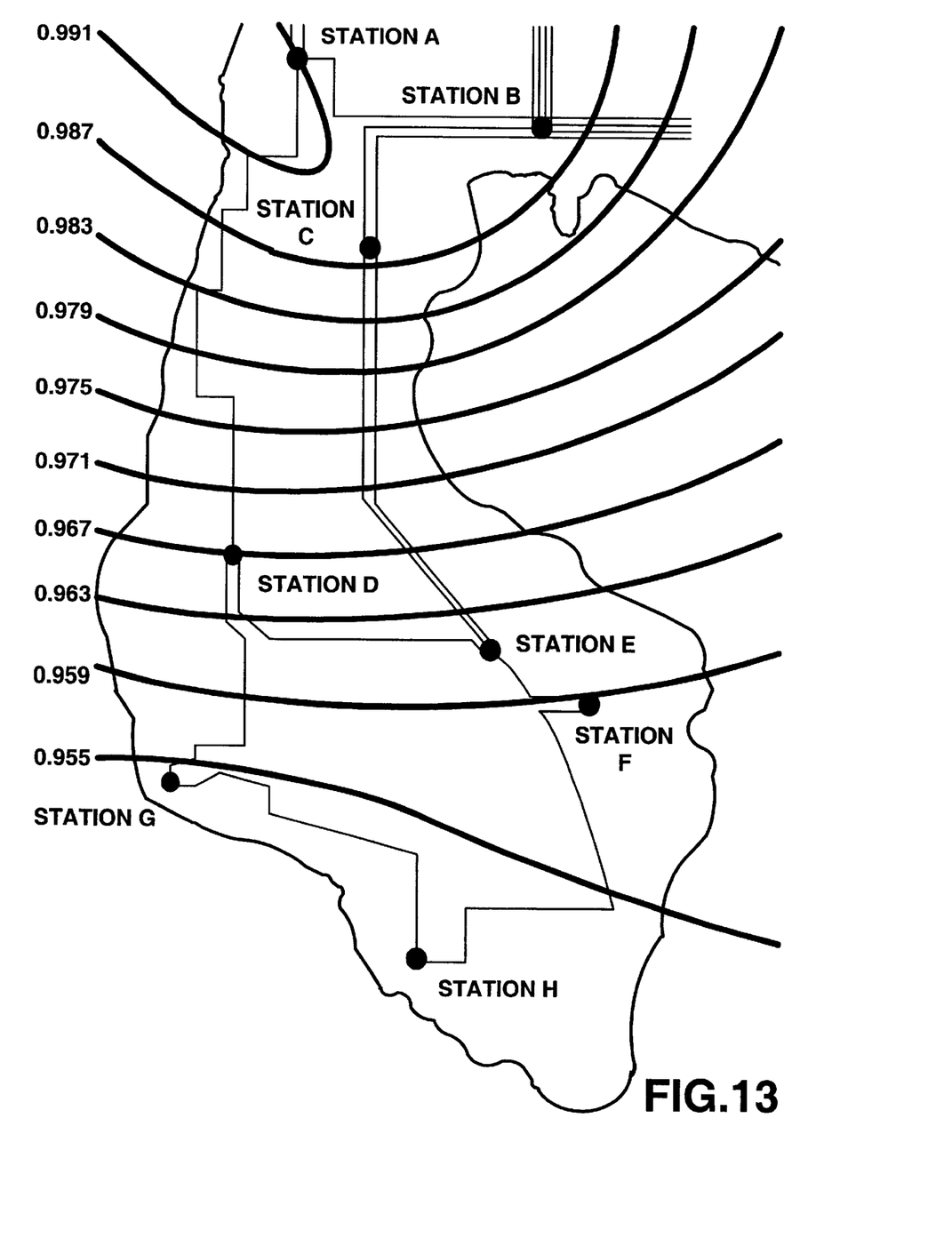

Once a disturbance has occurred in a region being monitored as displayed in FIGS. 12 and 13, a system operator of the present invention can immediately identify trouble anywhere in a large interconnected system. The ability of phasor contour configuration means 73 to then zoom-in to the area of concern will provide an operator with immediate insight into the nature and location of a disturbance for the initiation of corrective action.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A system for displaying dynamic on-line operating conditions of an interconnected power transmission network including means to monitor the interconnected power transmission network by measuring and correlating voltage magnitude and phase existing at a plurality of selected station busses of the interconnected power transmission network and to display isovoltage and isophase contour lines on a map representative of the interconnected power transmission network geographic area at a central location thereby showing existing operating conditions of the interconnected power transmission network wherein the location and nature of any disturbances occurring on the interconnected power transmission network is indicated on said map by a change in the positions of the isovoltage and isophase contour lines relative to the normal network operating isovoltage and isophase contour lines such that upon detection of an abnormal operating condition a system operator may initiate action within the interconnected power transmission network to correct for the specific system disturbance or abnormality.

2. The system of claim 1 wherein each said selected station buss is coupled to a microprocessor to digitize the corresponding buss voltage magnitude and phase information and time stamp said digitized buss information with a common network time base and transmit said digitized buss information to the central location wherein the central location includes a microprocessor unit to receive said digitized buss information, to convert said digitized buss information to a common voltage and phase reference, to correlate said digitized buss information with the corresponding geographic coordinates of said corresponding selected station busses, to interpolate said data on a geographic basis to provide geographic points of common electrical values of voltage magnitude and phase and to join said common valued points with contour lines to provide a visual display of voltage and phase conditions across the interconnected power transmission network.

3. The system of claim 2 wherein said microprocessor comprises an analog to digital converter including means to receive and convert analog line voltage information to digital data, a line voltage analyzer including means to determine the maximum voltage value received from said corresponding selected station buss through said analog to digital converter to convert the voltage value to the normalized decimal equivalent and a time stamp device to time stamp the maximum voltage value with time information corresponding to the time of occurrence of the maximum voltage value and a line voltage signal generator including means to calculate the phasor values of the maximum voltage value received from said line voltage analyzer and to generate and transmit voltage phasor data representative of said transmission line voltage of said corresponding selected station buss.

4. The system of claim 3 wherein said microprocessor includes a communication means to transmit said data to a communication hub at the central location from said selected station busses.

5. The system of claim 3 wherein said time stamp devices throughout the interconnected power transmission network are synchronized and fed time information by a digital time transmission system.

6. The system of claim 3 wherein each said microprocessor further includes data storage to store selected transmission line signal data.

7. The system of claim 3 further including a network communication hub to feed on-line system information packets received from each said communication means sequentially to said microprocessor unit.

8. The system of claim 7 further including data evaluation means to compare existing system conditions with preset voltage magnitude and phase limits.

9. The system of claim 8 wherein said preset limits are determined by model estimations.

10. The system of claim 8 wherein said microprocessor unit includes a security setting means having an input means to selectively adjust said preset limits.

11. The system of claim 10 wherein said data evaluation means further includes a phasor data access means that responds to said preset limits established by said security setting means as a feedback loop utilizing on-line system conditions to initiate automatic system response.

12. The system of claim 11 wherein said feedback loop further provides on-line data for the theoretical assessment of a system response to any varied condition set by the user through an estimation input means as a function of power system operation to generate an on-line model for system planning and to the evaluation of changes or additions to a system.

13. The system of claim 7 wherein said microprocessor unit further includes a phasor contour configuration means to interpolate incoming voltage phasor values with the corresponding locations on said map and to generate isophase and isovoltage contour signals corresponding to each said selected station buss.

14. The system of claim 13 wherein said signals from said phasor contour configuration means is fed to a geographic voltage magnitude plot video monitor and a geographic phase plot for viewing of on-line operations.

15. The system of claim 14 wherein said isophase contour lines and said isovoltage contour lines are formed from said isophase and isovoltage contour signals for a visual display.

16. The system of claim 15 wherein said corresponding isophase presentation and isovoltage presentation of the security setting means provides an audible alarm coordinated with the visual displays of said geographic voltage magnitude plot video monitor and said geographic phase plot for any sudden change of the isocontour lines exceeding said preset limits.

17. The system of claim 2 wherein said microprocessor comprises an analog to digital converter including means to receive and convert analog line voltage information to digital data, a polyphase voltage converter including means to convert the digitized three-phase voltage data to a polyphase voltage by means of a symmetrical sequence analysis line voltage analyzer including means to determine the maximum voltage value representative of the polyphase voltage received from said corresponding selected station buss through said analog to digital converter, to convert the maximum voltage value to a normalized decimal equivalent and a time stamp device to time stamp the maximum voltage value with time information corresponding to the time of occurrence of the maximum voltage value and a line voltage signal generator including means to calculate the phasor values of the time stamped maximum voltage value received from said line voltage analyzer and to generate and transmit voltage phasor data representative of the line voltage of said corresponding selected station buss.

18. The system of claim 17 wherein said microprocessor includes a communication means to transmit data to a communication hub at the central station from said selected station busses.

19. The system of claim 18 further including a network communication hub to feed on-line system information packets received from each said communication means sequentially to said microprocessor unit.

20. The system of claim 19 further including data evaluation means to compare existing system conditions with preset voltage magnitude and phase limits.

21. The system of claim 20 wherein said preset limits are determined by model estimations.

22. The system of claim 19 wherein said microprocessor unit includes a security setting means having an input means to selectively adjust said preset limits.

23. The system of claim 19 wherein said data evaluation means further includes a phasor data access means that responds to said preset limits established by said security setting means as a feedback loop utilizing on-line system conditions to initiate automatic system response.

24. The system of claim 23 wherein said feedback loop further provides on-line data for the theoretical assessment of a system response to any varied condition set by the user through an estimation input means as a function of power system operation to generate an on-line model for system planning and to the evaluation of changes or additions to a system.

25. The system of claim 19 wherein said microprocessor unit further includes a phasor contour configuration means to interpolate incoming voltage phasor values with the corresponding locations on said map and to generate isophase and isovoltage contour signals corresponding to each said selected station buss.

26. The system of claim 25 wherein said signals from said phasor contour configuration means is fed to a geographic voltage magnitude plot video monitor and a geographic phase plot for viewing of on-line operations.

27. The system of claim 26 wherein said isophase contour lines and said isovoltage contour lines are formed from said isophase and isovoltage contour signals for a visual display.

28. The system of claim 27 wherein said corresponding isophase presentation and isovoltage presentation of the security setting means provides an audible alarm coordinated with the visual displays of said geographic voltage magnitude plot video monitor and said geographic phase plot for any sudden change of the isocontour lines exceeding said preset limits.

29. The system of claim 17 wherein said time stamp devices throughout the interconnected power transmission network are synchronized and fed time information by digital time transmission system.

30. The system of claim 17 wherein each said microprocessor further includes a data storage to store selected transmission line information.

31. The system of claim 17 wherein each said microprocessor includes logic means to generate a symmetrical sequence analysis to monitor, evaluate and display the operating conditions existing on all three phases at said selected station busses.

32. The system of claim 31 wherein said logic means includes means to segregate the three phase voltages into positive, negative, and zero sequence voltage values.

33. The system of claim 32 wherein said sequence quantities are derived as:

$$V_1 V_a + a V_b + a^2 V_c$$

$$V_2 V_a + a^2 V_b + a V_c;$$

$$V_0 V_a + V_b + V_c$$

respectively where the notation is standard for sequence values in power engineering in which the operator "a" is a unit operator $e^{2\pi/3}$ which equals 0.866+j0.5, or 1@120°.

34. The system of claim 33 wherein the positive sequence values of magnitude and phase are displayed as the isophase and isovoltage contour lines.

* * * * *